US010255031B2

(12) United States Patent
Dange

(10) Patent No.: US 10,255,031 B2
(45) Date of Patent: Apr. 9, 2019

(54) MUSIC PLAYBACK FOR AFFILIATED SERVICES

(71) Applicant: Facebook, Inc., Menlo Park, CA (US)

(72) Inventor: Amod Ashok Dange, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 161 days.

(21) Appl. No.: 15/424,001

(22) Filed: Feb. 3, 2017

(65) Prior Publication Data
US 2018/0225081 A1 Aug. 9, 2018

(51) Int. Cl.
| | |
|---|---|
| *G06F 3/16* | (2006.01) |
| *H04L 29/06* | (2006.01) |
| *H04L 29/08* | (2006.01) |
| *G06F 17/30* | (2006.01) |
| *G06Q 30/02* | (2012.01) |

(52) U.S. Cl.
CPC ........ *G06F 3/165* (2013.01); *G06F 17/30761* (2013.01); *G06F 17/30772* (2013.01); *G06Q 30/0277* (2013.01); *H04L 65/604* (2013.01); *H04L 67/1095* (2013.01); *H04L 67/02* (2013.01)

(58) Field of Classification Search
CPC ............... G06F 3/165; G06F 17/30761; G06F 17/30772; G06Q 30/0277; H04L 65/604; H04L 67/02; H04L 67/1095
USPC ................... 700/94; 709/201–207, 217–248
See application file for complete search history.

(56) References Cited

U.S. PATENT DOCUMENTS

| | | | |
|---|---|---|---|
| 6,662,231 B1 * | 12/2003 | Drosset ............. | G06F 17/30017 707/E17.009 |
| 2011/0301728 A1 * | 12/2011 | Hamilton ............. | G11B 27/034 700/94 |
| 2014/0115479 A1 * | 4/2014 | Wang .................... | H04L 67/322 715/727 |
| 2016/0094893 A1 * | 3/2016 | Tse ....................... | H04N 21/812 725/32 |
| 2016/0378426 A1 * | 12/2016 | Davis ..................... | G06F 3/167 381/77 |
| 2017/0124664 A1 * | 5/2017 | Savenok ................ | G06Q 50/01 |
| 2017/0353705 A1 * | 12/2017 | Rivera ................... | G11B 27/11 |

* cited by examiner

Primary Examiner — Hemant S Patel

(57) ABSTRACT

Exemplary embodiments relate to techniques for presenting music or other media to a user. A provider of a service may be affiliated with one or more other services offered through different sites or apps. A system may allow streaming of music through one of the services as long as an affiliated service remains as an active or foreground service on a device. Thus, a user can switch between services and continue to stream the music. The active service may provide visual advertisements that support the music streaming. Thus, the music is provided to a user of the service without a direct subscription fee or audible advertisements inserted into the music stream. Because the music is streamed through at least one of the services, the service provider can track playback metrics and remunerate the music provider accordingly.

20 Claims, 15 Drawing Sheets

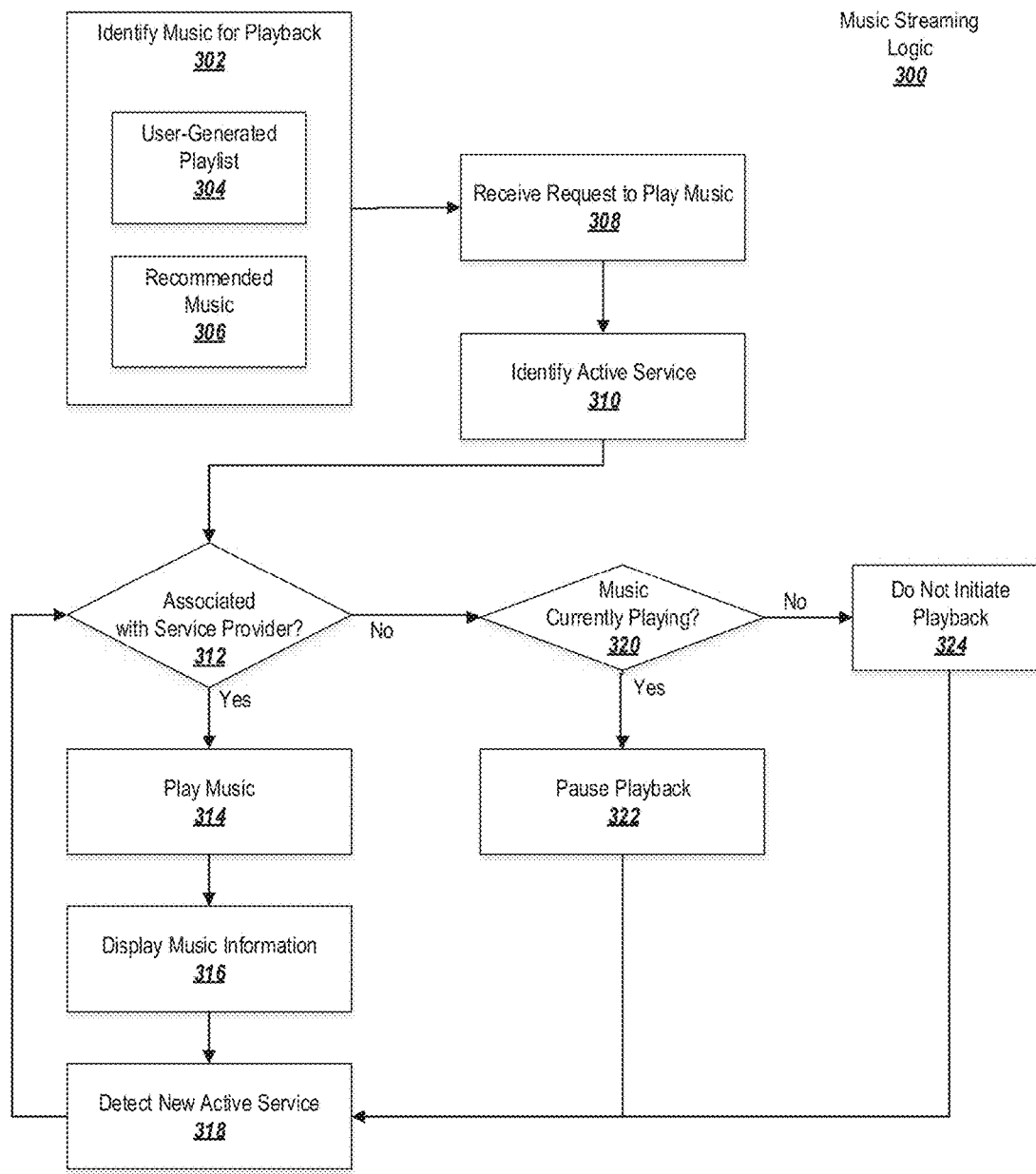

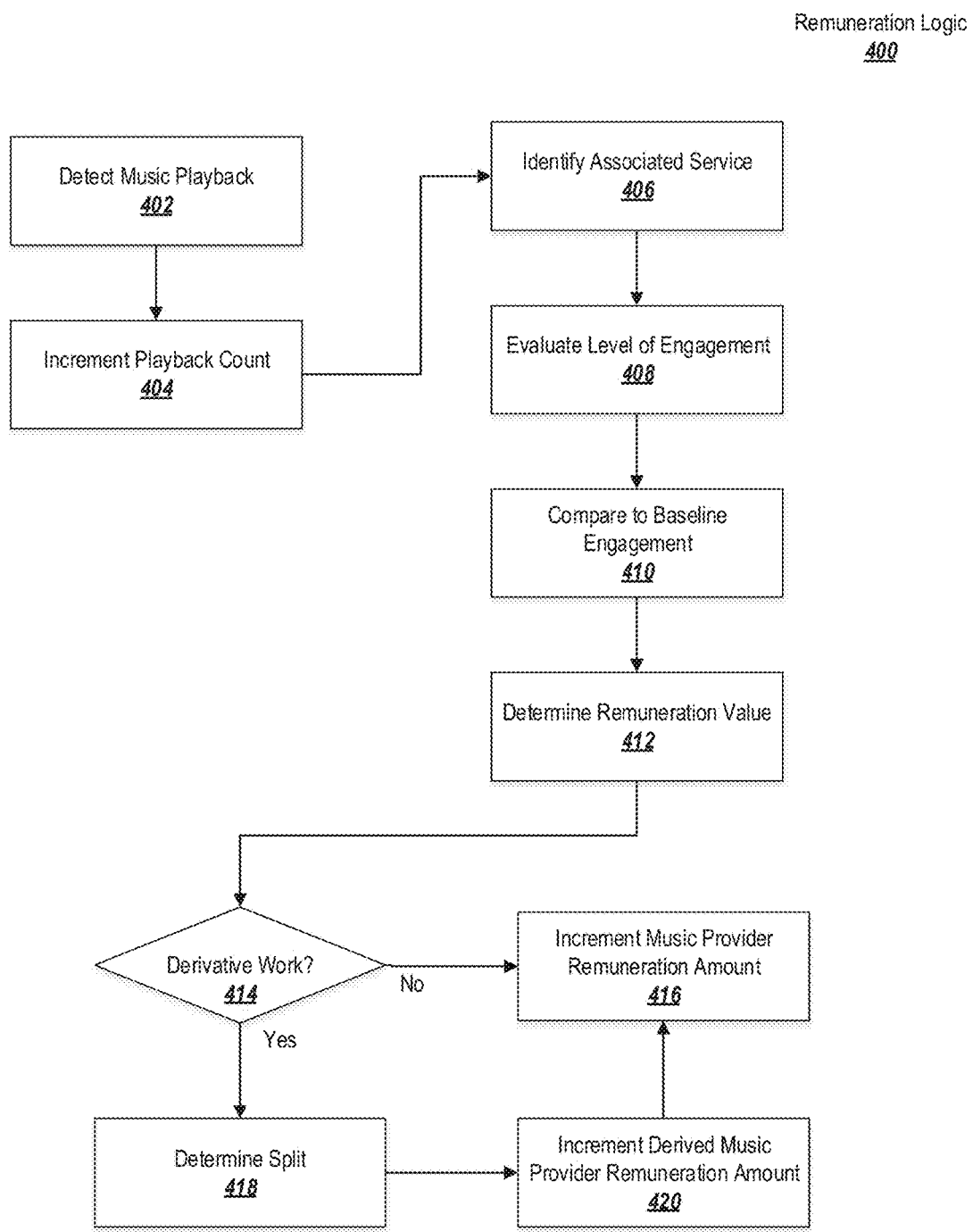

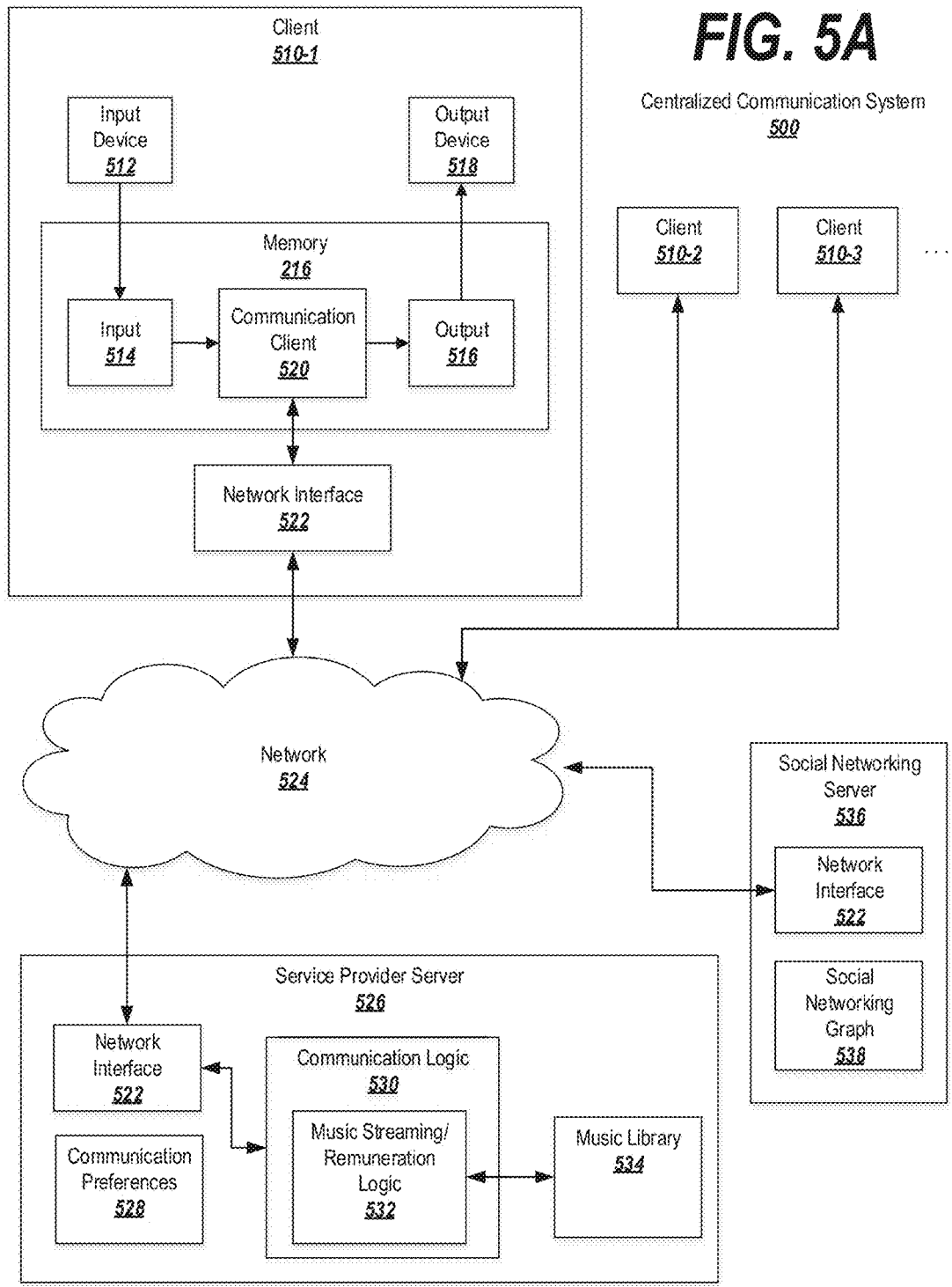

Distributed Communications System 550

MUSIC PLAYBACK FOR AFFILIATED SERVICES

BACKGROUND

Traditionally, music has been sold one copy at a time, in the form of albums or digital files. This method of distribution has been problematic for a number of reasons. For example, it may be difficult to prevent copies of the music from being made and distributed against the wishes of the recording artist or distributor. Furthermore, most of the revenue of the music sales is typically retained by a distribution or recording company, and only a relatively small amount is received by the artist.

Recently, music streaming has become a popular alternative to traditional music sales. A music streaming service may make a library of music available to a user. A music streaming service may monetize their service by charging a subscription fee; however, this may discourage some users from using the service and usage numbers may be depressed as a result. Alternatively, the music streaming service may offer a free version of the service that is supported by advertisements. This typically requires that an audible promotion is played between songs, which degrades the user experience.

BRIEF DESCRIPTION OF THE DRAWINGS

FIG. 3 is a flowchart depicting exemplary logic for streaming music within an ecosystem.

FIG. 4 is a flowchart depicting exemplary logic for remunerating a music provider.

FIG. 5A is a block diagram providing an overview of a system including an exemplary centralized communications service;

DETAILED DESCRIPTION

Figure 1A:
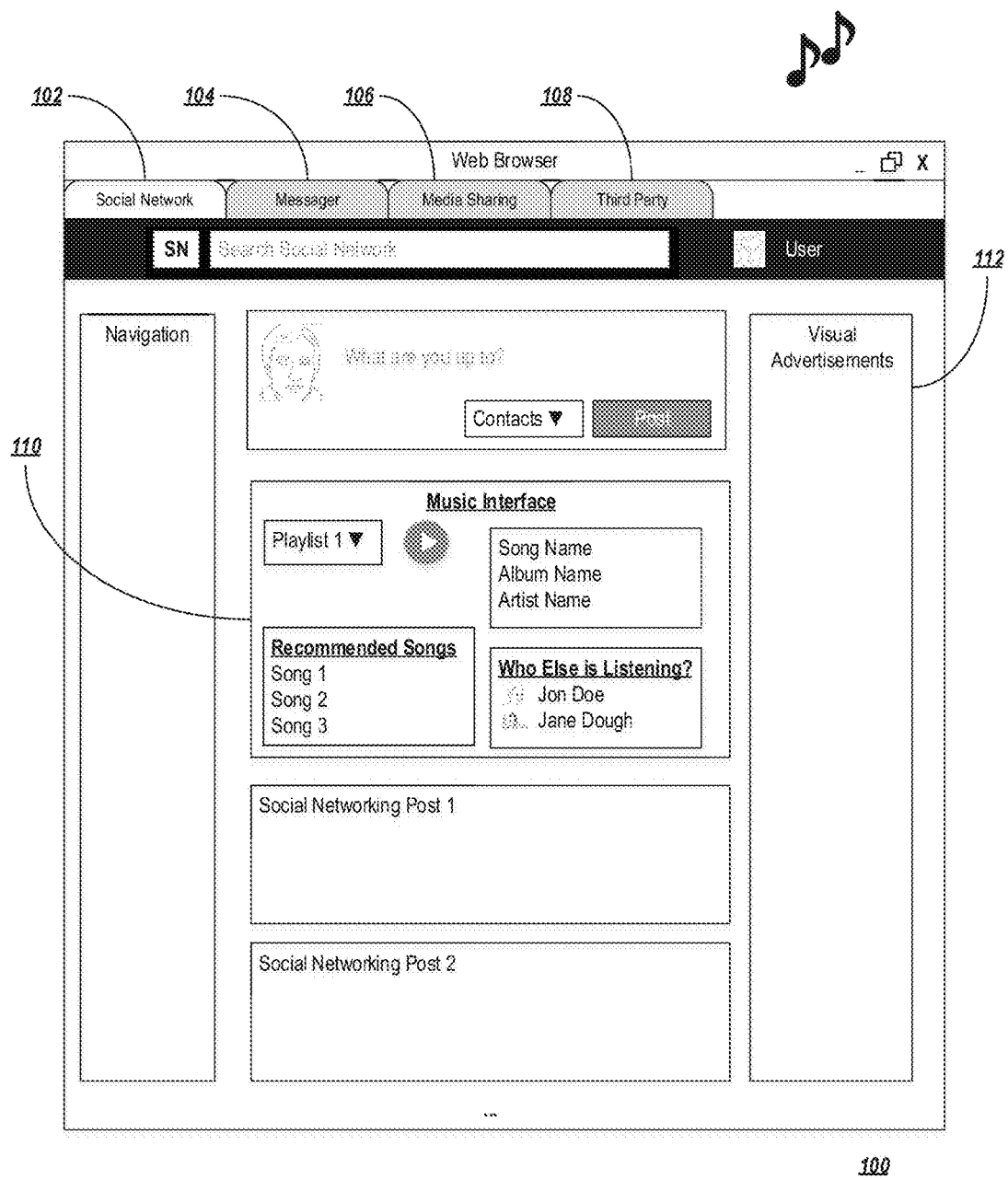
FIG. 1A depicts music playback while a first web page is active on a device.

Exemplary embodiments relate to techniques for presenting music (or other types of media, especially audio) to a user, without the need for subscription fees and/or audible promotional materials. Often, when a user is listening to music while online, the user may be interacting with one or more services in the form of websites or apps. For example, the user may interact with a social networking service, a messaging service, a media sharing service, etc. According to exemplary embodiments described herein, a user may be permitted to stream music while the user is active on one of the services. While the user interacts with the service(s), visual advertisements may be displayed to the user through the service(s). Based on the display of the visual advertisements, the service(s) may be compensated. Because some interaction with the service(s) can be assumed to be attributable to the streaming music provided by the service (which drives increased compensation from display of the visual media), the service can monetize the streaming music capabilities without the need to charge a subscription fee or interrupt the music stream with audible promotional materials.

In some embodiments, the services may be affiliated with a service provider responsible for each of the services. For example, the same business may operate an ecosystem of services, such as a social networking service, a messaging service, a media sharing service, etc. Because the service provider may benefit from visual advertisements displayed in connection with any of the services affiliated with the service provider, the system may authorize the music streaming capabilities to continue playback when the user switches between the services. Thus, a user may interact with a number of different services while still maintaining playback of the music stream. Accordingly, uninterrupted user enjoyment of the music stream is enhanced, while the user is also encouraged to remain within the ecosystem of the service provider.

More specifically, a system may allow streaming of music through one of the services as long as an affiliated service remains as an active or foreground service on a device. For example, each of the services may be offered through different websites, apps, etc. As long as one of the provider's websites remains in an active tab on a web browser, or as long as one of the provider's apps remains as a foreground app on a device, the music may continue to play. When the user navigates away from the webpage, makes a different webpage (that is not affiliated with the service provider) the active tab, or makes a different app (that is not affiliated with the service provider) the foreground app, the music may cease playing (e.g., the music may pause). When the user returns to a website or app affiliated with the service provider, the music may continue to play back. Thus, a user can switch between services and continue to stream the music.

The service provider may be, e.g., a business, an organization, a brand, etc. The provider need not necessarily be a single entity; for example, multiple different businesses may decide to affiliate with each other in order to allow for continuous music streaming while any of the services of the multiple business are active.

In some embodiments, the active service may provide capabilities for measuring activity of a user, or detecting user inactivity. If the user is determined to be inactive in the service, even though the service is the active tab or app, the system may pause or cease playback of the music.

The music may be uploaded by a user of the service, or may be licensed by the service. The streaming service may directly compensate music providers for their music. A music provider may be any entity that owns or controls the copyright in the music, such as the original music author, a distribution or recording company, etc. For example, the music provider may be paid a royalty each time one of the music provider's songs is played. In some embodiments, the amount of interaction or engagement with the service that is due to the music streaming may be determined or estimated, and compensation to the music provider may be established based on the increase in interaction or engagement attributable to the music provider.

Moreover, the social aspects of the service may encourage more engagement with the music between and among users. For example, a user may create a playlist through one of the services and share the playlist with other users of the service. The playlist may be played in a synchronized manner on devices of each of the users that choose to play the originating user's playlist. This may provide a "listen together" experience that multiple users may share, even when the users are not present in the same physical location. In another embodiment, the system may recommend music to be played through the streaming service based on information in a social graph maintained by one or more of the services.

In some embodiments, the music need not necessarily be played, e.g., in a playlist. Because the service provider is provided access to the music by the music provider, the service provider may provide a capability for users of the service provider's services to tag content with music. For example, a user of a social network may upload a video to the social network, and may tag the video with a song available through the social network. Because both the video and the song are available through the social network, there is no need for the user to edit the video to incorporate the song; the social network can retrieve the song and play it in conjunction with the video. Because the social network is capable of tracking the number of times the video is played, the service provider may remunerate the music provider (e.g., pay a royalty) based on the number of times the video is played.

In further embodiments, the content shared need not necessarily be music. For example, the content may be live audio being broadcast or transmitted by a user of the service (e.g., allowing friends to conduct a conversation with each other as long as at least one service associated with the service provider is active), a business meeting teleconference, a live performance, etc.

In still further embodiments, the system may establish a hierarchy of sound. For example, a phone call received through the device may take first priority, such that any music playing through the service provider may be muted in favor of the phone call. Music provided through the service provider may further be categorized as selected music (e.g., music that the user has specifically selected for playback, in the form of a playlist or a selected song, album, or artist), which may take priority over music categorized as background music. Background music may be provided when the user instructs a service of the service provider to begin playing music, but does not specify the music to be played. In some embodiments, background music may be designated by selecting a genre of music, or the user may select a collection of music (e.g., a music station) selected by the service provider, users of the service, or a third party).

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components

122-1, 122-2, 122-3, 122-4, and 122-5. The embodiments are not limited in this context.

FIG. 1A depicts an exemplary music playback while a first web page is active on a device. More specifically, an interface 100 displays a web browser having a number of tabs 102, 104, 106, 108 which are currently opened. One of the tabs (tag 102) is designated as an active tab. The active tab may be the currently-opened tab which has the focus of the web browser, and to which user interactions (e.g., mouse clicks, keyboard presses, gestures, etc.) are directed by the operating system. The active tab may, when the web browser is active, be the foreground process or thread active in the operating system. When the web browser is active (e.g., the web browser is minimized or is otherwise not the active application), the active tab may run in the background (e.g., as a background process or thread) along with the web browser.

The remaining tabs (104, 106, 108) are inactive tabs. The inactive tabs may continue to run in the background (e.g., as background processes or threads), but are not the focus of user activity and do not receive user input until they are made active.

The active tab 102 depicted in FIG. 1A is associated with a social networking service, whose website is displayed in a main browser window. In the social networking service's portion of the interface 100, a music interface 110 may be provided. The music interface 110 may provide a number of capabilities, such as initiating, pausing, or stopping playback of music, selection of a song or playlist to be played, displaying information about a song or playlist, and providing access to social aspects of music playback enabled by the service.

In the depicted example, the music interface allows a user to select between a number of playlists (e.g., created by the user and/or created by the social networking service based on the user's interests as reflected in a social networking graph). The interface also displays song recommendations (e.g., based on the user's interests as reflected in the social networking graph). Song information and social information are also displayed. The song information may include, e.g., the name of the song, the album on which the song was released, the date of release of the song, cover art for the song and/or album, a name of the artist who performed the song, historical information about the song, etc.

The social information may include, for example, the names, pictures, and other profile information of other users currently listening to the same playlist. For example, the current user may be provided with an opportunity to share a playlist with their contacts in the social networking service. Other users may receive a notification upon receiving the shared playlist, or may see the shared playlist in their news feed. The users may select the playlist to play the set of songs included in the playlist. In some embodiments, playback of the playlist may be synchronized among the users of the service so that each song is played at the same time for each user. Accordingly, the users may be provided with a "listen together" experience.

In some embodiments, a listening user may share a song from a subscription-based music service to their social network contacts. The song may appear as a content item in the news feed of some or all of the users in the listening user's contacts list. If the other users are subscribers to the subscription-based music service, the other users may be permitted to play the song in full. Otherwise, the users may be permitted to play only a preview of the song.

The interface 100 may also include one or more visual advertisements 112 associated with the social networking service. The display of the visual advertisements may provide revenue to the social networking service.

The user may choose to initiate or continue playback of a music stream from the music interface 110. As long as the user remains on the web browser tab 102 associated with the music streaming service, the music may continue to play. Furthermore, if the user navigates to another tab associated with a different service that is affiliated with the same service provider, then music playback may continue.

Figure 1B:
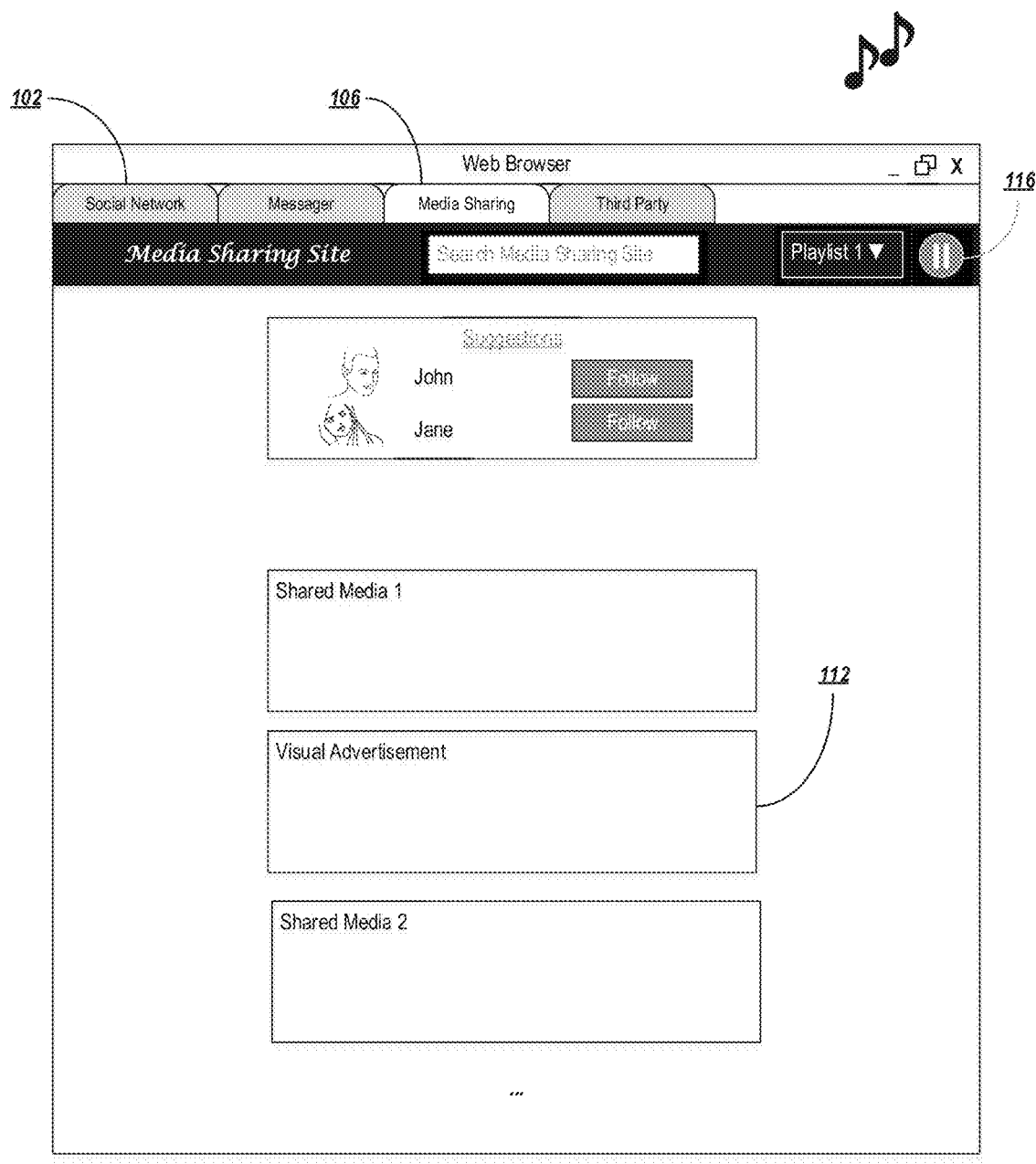
FIG. 1B depicts music playback while a second web page is active on the device.

For example, FIG. 1B depicts music playback continuing while a second web page is active on the device. In this example, the user has selected a tab 106 associated with a media sharing service, thus making the tab 106 the active tab. The social networking tab 102 has now become an inactive tab. The media sharing service page also displays visual advertisements 112 that provide revenue to the media sharing service. Because the media sharing service is associated with the same service provider as the social networking service, the music streaming continues to be monetized while the media sharing service is active. Accordingly, playback is permitted to continue when the user changes from the social networking service tab 102 to the media sharing service tab 106.

Figure 1C:
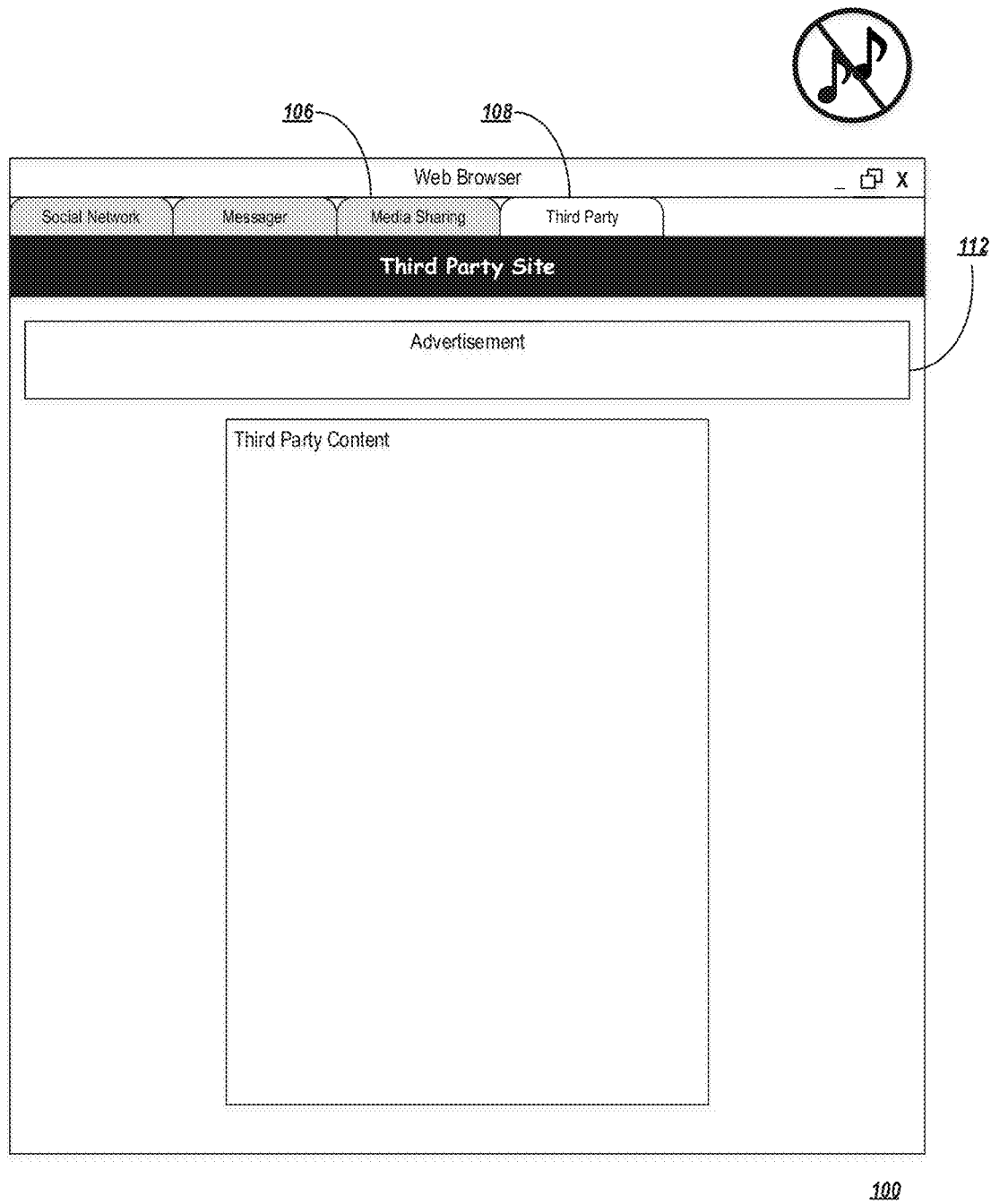
FIG. 1C depicts a cessation of music playback when a third web page becomes active on the device.

In contrast, when the user navigates to a third-party service that is not associated with the service provider, playback of the music may cease. For example, FIG. 1C depicts a cessation of music playback when a third web page becomes active on the device. In this case, the tab 108 associated with the third-party's website has become active on the browser, making the media sharing service's tab 106 an inactive tab. Because the display of visual advertisements 112 on the third-party site no longer benefits the service provider, music playback from the service provider may cease. For example, in one embodiment, the music stream may be paused when it is detected that no tabs associated with the service provider are active. Playback may be resumed when the user navigates back to a tab associated with the service provider.

In some embodiments browser tabs associated with the service provider may be identified (e.g., with an icon, color, effect, etc.) to indicate which tabs will allow the user to continue music playback.

Figure 2A:
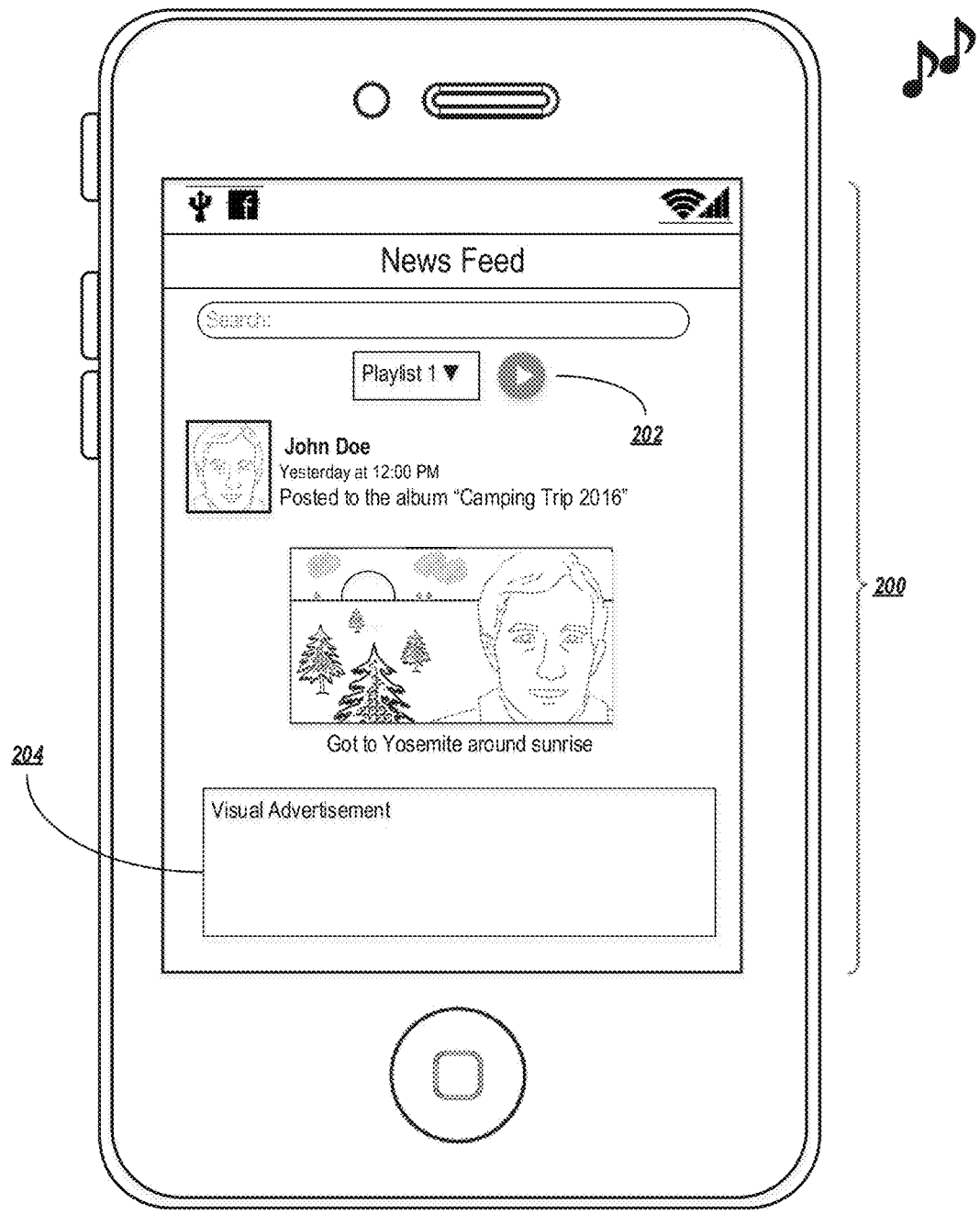
FIG. 2A depicts music playback when a first app is active on a mobile device.

Although previous examples have been described in connection with web sites displayed in a browser, other possibilities are also contemplated. For example, FIG. 2A depicts music playback occurring when a first app is active (e.g., is the foreground app) on a mobile device. In this example, the first app (an app associated with a social networking service) displays an interface 200. The interface 200 may include a music interface 202, which may exhibit reduced size and/or functionality as compared to the music interface 110 provided on a full-sized web page. The interface 200 may also include content for the app, and may display one or more visual advertisements 204. As in previous examples, the display of the visual advertisements may support the social networking service and therefore allow the music streaming to be monetized without the need for a subscription service and/or audible promotions.

Figure 2B:
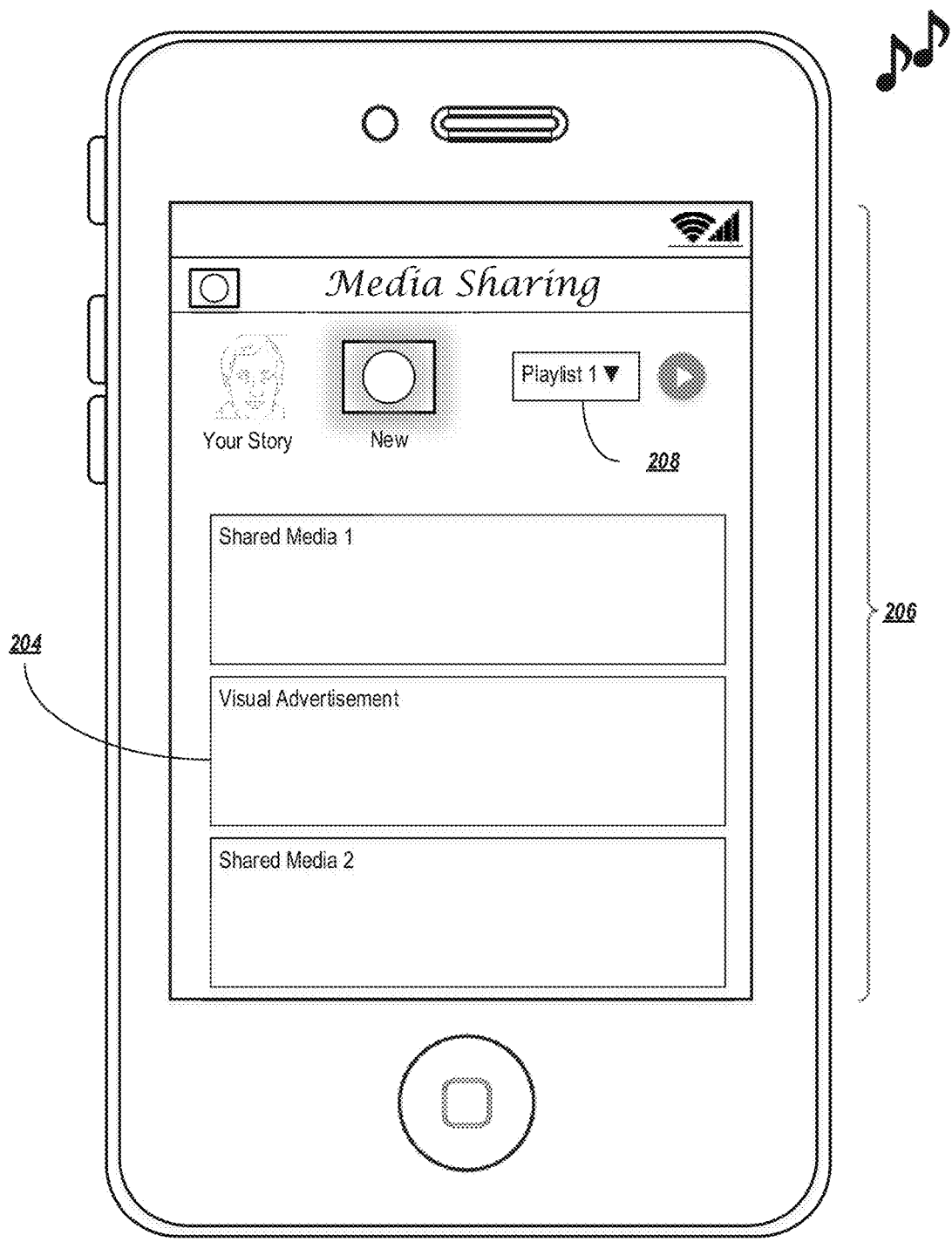
FIG. 2B depicts a continuation of music playback when a second app is active on the mobile device.

When the user changes to a different active app that is also associated with the service provider, music playback may continue, as shown in FIG. 2B. In this example, the second app may display a second interface 206 that may also include a music interface 208. The music interface 208 may be the same as, or different than, the music interface 202 of the first app. Visual advertisements 204 may also be displayed in connection with the second app. As long as the user continues to interact with apps affiliated with the service provider, music playback may continue.

Figure 2C:
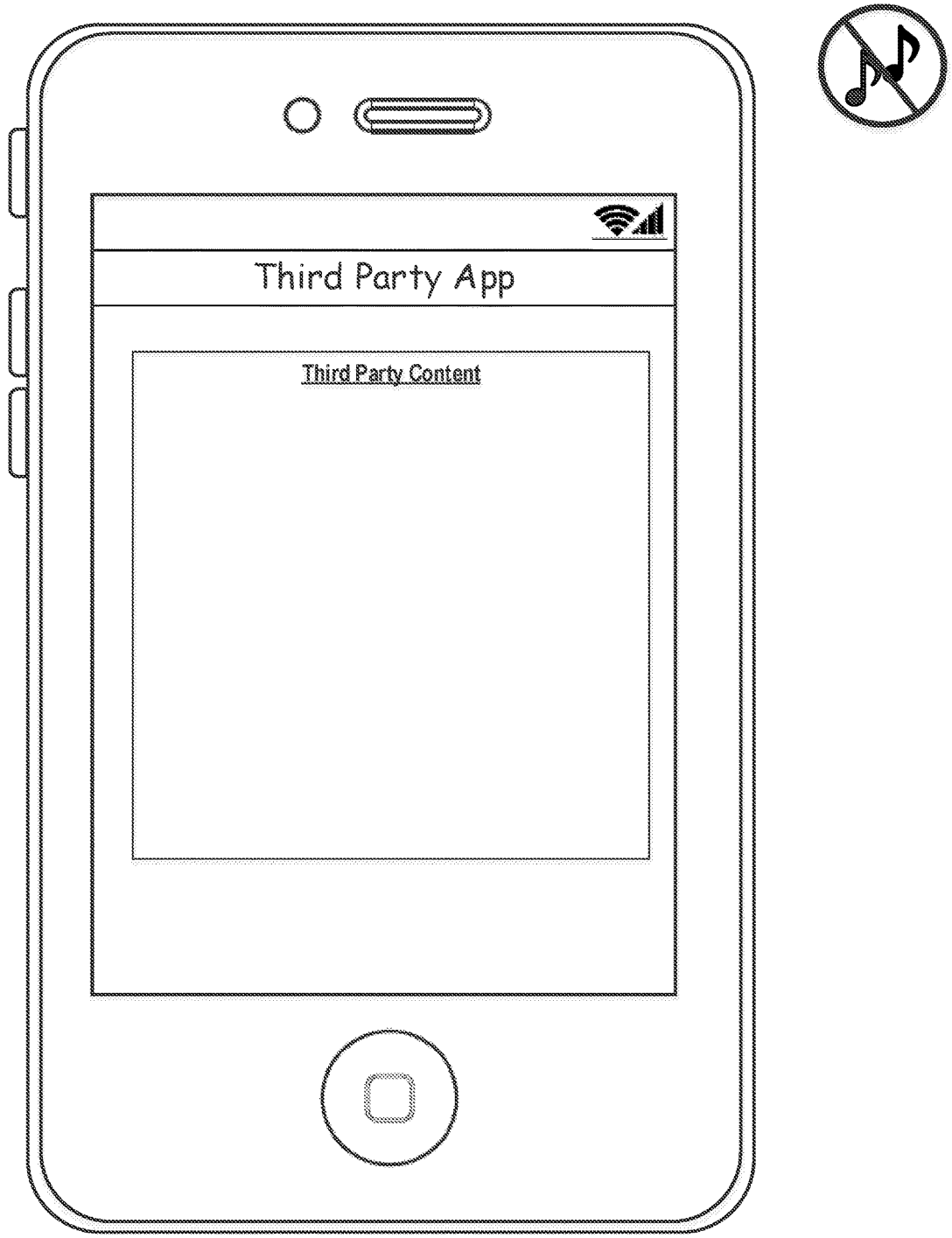
FIG. 2C depicts a cessation of music playback when a third app becomes active on the device.

In contrast, if the user makes a third-party app the active app, as shown in FIG. 2C, music playback may cease. Music playback may, for example, be paused until the user makes an app associated with the service provider the active app on the device.

Next, exemplary techniques for providing a music streaming service and for remunerating music providers are described with reference to FIGS. 3-4.

Exemplary Techniques

FIG. 3 is a flowchart depicting exemplary logic 300 for streaming music within an ecosystem.

At block 302, a system (such as a mobile device, computer, server, etc.) may identify music for playback. The music may be music stored in a music library, which may include music licensed to a service provider and/or music uploaded to the service provider by music providers.

The identified music may be, for example, a user-generated playlist 304. A user-generated playlist 304 may include a set of music specified by a current user of the service, or by a contact of the user in the service (e.g., a friend in a social networking service). The identified music may, alternatively or in addition, be recommended music 306, which may include music recommended to the current user by the service. The music may be recommended based on the current user's interests as reflected in a social graph, and/or may be recommended based on the interests of the current user's contacts (e.g., friends in a social networking service).

The identified music may be presented to the user, e.g., through a music interface that forms part of the service's website or app. The user may be presented with an option allowing the user to select music for playback. Alternatively or in addition, the user may establish preferences or rules that specify playback under certain conditions. For example, the system may automatically play music from a certain genre, era, artist, etc. when the user logs into the service. In another example, certain music may be triggered when a condition occurs, such as when a particular group of users of the service are online or active at the same time.

At block 308, the system may receive a request to play music. The request may be received, e.g., through a music interface of the service, or due to a preference or rule being fulfilled. The request may identify specific music to be played, may designate a category of music to be played, or may simply request that any music be played (e.g., music that the service or service provider predicts that the user would enjoy).

At block 310, the system may identify the currently active service on the user's device. This may include identifying the foreground thread or app on a device, the active tab in a web browser, etc. Optionally, the system may also determine whether the user is active within the service. For example, the system may determine if the user has interacted with the service within a predetermined amount of time (e.g., retrieved a content item, messaged another user, interacted with an advertisement, etc.). If the user is not active within the service, even though the service is the active service on the user's device, music playback may not be initiated or may be paused.

At block 312, the system may determine whether the active service identified in block 310 is associated with the service provider. A service may be associated with a service provider if the service provider provides or is responsible for the service. A service may also be associated with a service provider if the service provider has an agreement to associate with the service, or if the service provider whitelists or otherwise designates the service as being associated with the service provider. A list or database of affiliated services may be maintained on a server associated with the service provider, and the list or database may be consulted at block 312 to determine if the service is associated with the service provider. Alternatively or in addition, a web page or app associated with the service may include a tag, cookie, or some other indicator that designates the service as being associated with the service provider.

If the determination at block 312 is "yes" (i.e., the identified service is associated with the service provider), then processing may proceed to block 314. At block 314, the system may play the music designated in block 308. Information associated with the music may be displayed in block 316; such information may include, for example, information about the music or social information associated with the music or music playback. Processing may then proceed to block 318.

At block 318, the system may detect a new active service. For example, if the current foreground thread or app, or active tab is redesignated as a background thread or app or inactive tab, or if a new foreground thread or app or active tab is designated, then a new active service may be indicated. Processing may then return to block 312, and the system may evaluate the new active service to determine if it is associated with the service provider.

On the other hand, if the determination at block 312 is "no" (i.e., the identified service is not associated with the service provider), then processing may proceed to block 320. At block 320, the system evaluates whether music is currently playing. If so, then at block 322 playback may be paused. If not, then at block 324, playback may not be initiated in the first place (despite any request to play music as received in block 308).

Processing may then proceed to block 318 and the system may detect a changeover to a new active service.

Playback as illustrated in FIG. 3 may result in remuneration being provided to a music provider in the form of a royalty or other type of payment. FIG. 4 is a flowchart depicting exemplary logic 400 for remunerating a music provider.

At block 402, the system may detect playback of music. The music and/or a provider of the music may be identified (e.g., through metadata associated with the music). The provider may be the original author of the music, an owner of the copyright in the music, a distribution or recording company, etc.

Block 402 may be triggered, for example, when a request to play music is received, when the music is played as part of a playlist or recommendation, when a music stream advances and the music is selected as the next piece to be played, etc.).

At block 404, the system may increment a playback count associated with the music and/or the music provider. For example, the system may maintain a list or database of pieces of music and/or music providers. A count in the list or database associated with the music and/or the music provider may be incremented at block 404. When the music provider is paid out based on the list or database, the count may be reset.

Block 404 may provide a raw count of the number of times that a piece of music is played, which allows for a music provider to be paid a relatively straightforward royalty. However, in some embodiments it may be desirable to remunerate music providers based on the amount of traffic, engagement, etc. that the music provider drives to (or maintains at) the service provider's services. If the service provider is compensated for the music streaming service due to the presence of visual advertisements, then measuring increased engagement may provide a better sense of the music provider's economic value to the service provider.

For example, as first song may be played in the background while the user browses their social network news feed, but the user may not be paying any particular attention to the song. The user may be interacting with the social network news feed in the same manner, and for the same amount of time, as the user would have otherwise interacted had the song not been played. On the other hand, a second song may be played in which the user has a keen interest. The playing of the second song may drive the user to stay on the social network's site for longer than they otherwise would have, or to interact with the news feed more (e.g., posting comments about the song, tagging other users and encouraging them to listen to the song, etc.). In this example, the second song likely has increased value to the social networking service as compared to the first song.

Therefore, at block 406, the system may identify the service associated with the music playback in block 402. For example, the system may determine which service was in an active tab or foreground thread, process, or app when the playback was detected.

At block 408, the system may evaluate the user's level of engagement with the service at the time the song was played (and/or shortly thereafter). Engagement may be measured, for example, by identifying how long the user was active on the service after the song played, a level of activity (e.g., whether the user took certain actions associated with activity in the service, such as posting to the service, commenting through the service, viewing posts on the service, messaging other users on the service, etc.). Engagement may be quantified through an engagement score representing a level of user activity on the service over a predetermined time period associated with playback of the music.

At block 410, the engagement level measured in block 408 may be compared to a baseline level of engagement. The system may identify a current context associated with the user (e.g., time of day, tagged user location, etc.) and may determine the level of engagement that the user typically exhibits towards the service in the identified context (e.g., by consulting historical records associated with the user). Alternatively or in addition, the system may identify a level of engagement that other users (e.g., sharing similar characteristics with the original user) typically exhibit in the context, and the level of engagement from block 408 may be compared to the other users' level of engagement.

As an alternative to performing blocks 406-410 for individual users, the system may measure engagement in the service as a whole. For example, the system may evaluate, for a set of users listening to a particular song, a level of engagement for the users while the song is playing. That level of engagement may be compared to a level of engagement for the remainder of the user base (or a subset of the user base) not listening to the song at the same time.

Comparing the level of engagement at block 410 may involve comparing an engagement score associated with the baseline level of engagement to the engagement score calculated at block 408.

Processing may then proceed to block 412, where a remuneration value for the music provider may be determined. In some embodiments, the user may be paid a royalty for each time the song is played. Accordingly, the per-play amount of the royalty may be multiplied by the playback count determined at block 404, and this amount may be used as the remuneration value. Alternatively or in addition, the system may set the remuneration value based on the level of increased engagement attributable to the music, as determined in block 410. In this case, a scale may be established (e.g., guaranteeing a certain minimum payment, and then providing an increasing amount of payment depending on the level of increased engagement). Processing may then proceed to block 414.

At block 414, the system may determine if the music in question is a derivative work. For example, if the music is a cover song, includes musical elements derived from another song, etc., the song may be deemed derivative. In some cases, a music provider or a member of the service's user base may flag a particular song as derivative of another song. In other cases, determinations of derivation may be made algorithmically, by automatically comparing two or more pieces of music to determine a similarity between musical elements of the works.

If the determination at block 414 is "no" (i.e., the work is not derivative), then processing may proceed to block 416 and a remuneration amount of the music provider may be incremented based on the remuneration value determined in block 412. For example, the system may maintain a list or database identifying a current amount of payment due to each tracked music provider. At block 416, the entry associated with the music provider identified in block 402 may be incremented.

On the other hand, if the determination at block 414 is "yes" (i.e., the work is derivative), then the remuneration value determined in block 412 may be split between the music provider and the music provider that originated the music that the derivative work is based on. Thus, at block 418, the system may determine a split between the music provider and the original music provider. The split may be defined in an agreement between the music provider and the original music provider. Alternatively, a default split amount may be used (e.g., 50/50). Still further, the system may determine a level of engagement of the original work and the derivative work (similar to the operation performed in block 410), and may use this information as a proxy for how much of the economic value of the song was added by the music provider creating the derivative work. For example, if the engagement levels when the derivative work plays are very high, but the engagement levels when the original work plays are also very high, then it may be determined that most of the derivative work's popularity is due to the original song; accordingly, only a token amount may be assigned to the music provider of the derivative work in block 418. On the other hand, if the engagement levels for the original work are relatively low compared to the derivative work, then the split may favor the music provider of the derivative work.

Based on the split at block 418, the remuneration amount of the music provider that provided the original (derived) work may be incremented at block 420, and the music provider of the derivative work may be incremented at block 416. Processing may then terminate.

Communication System Overview

Figure 5B:
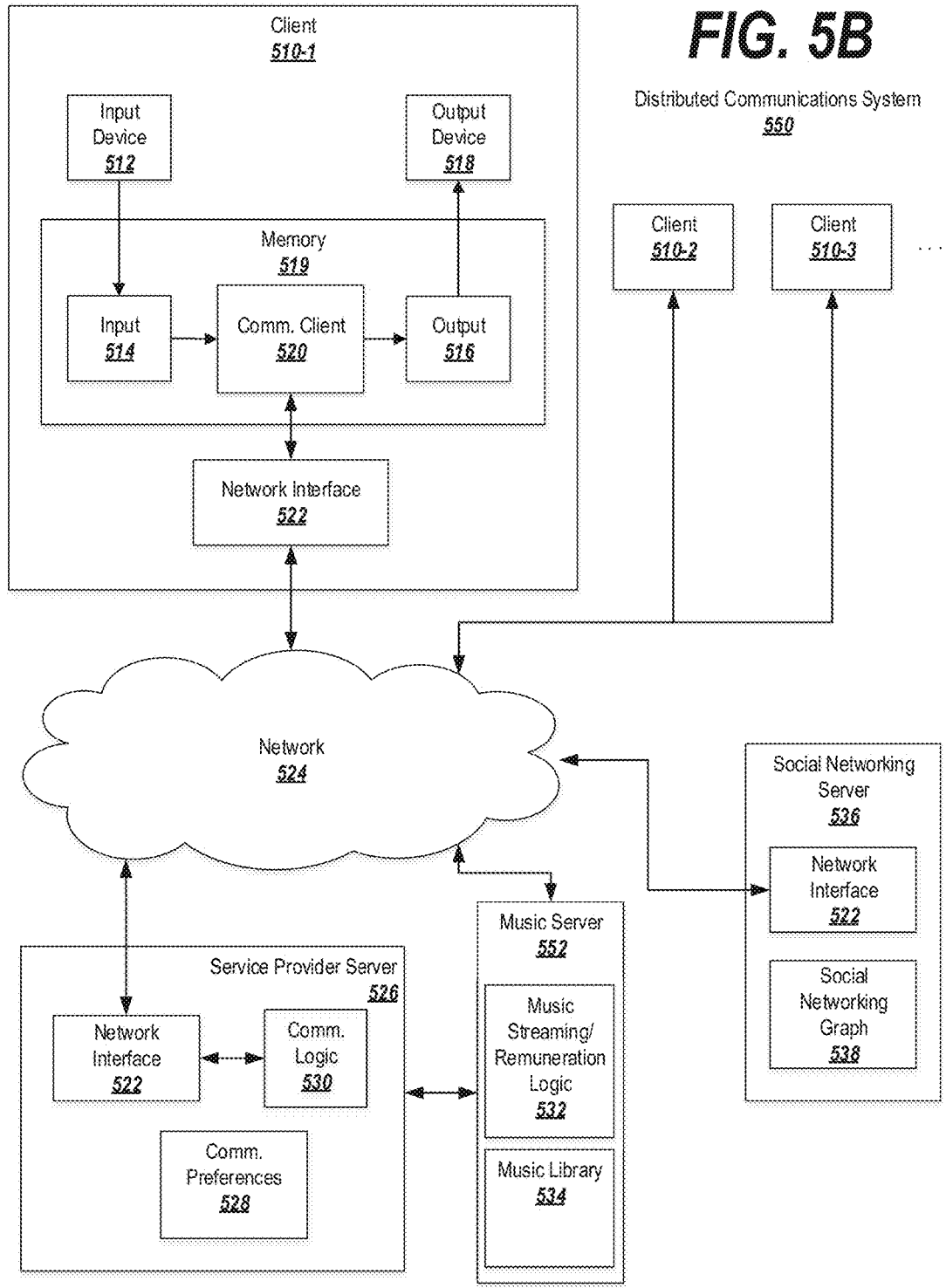
FIG. 5B is a block diagram providing an overview of a system including an exemplary distributed communications service.
Figure 5C:
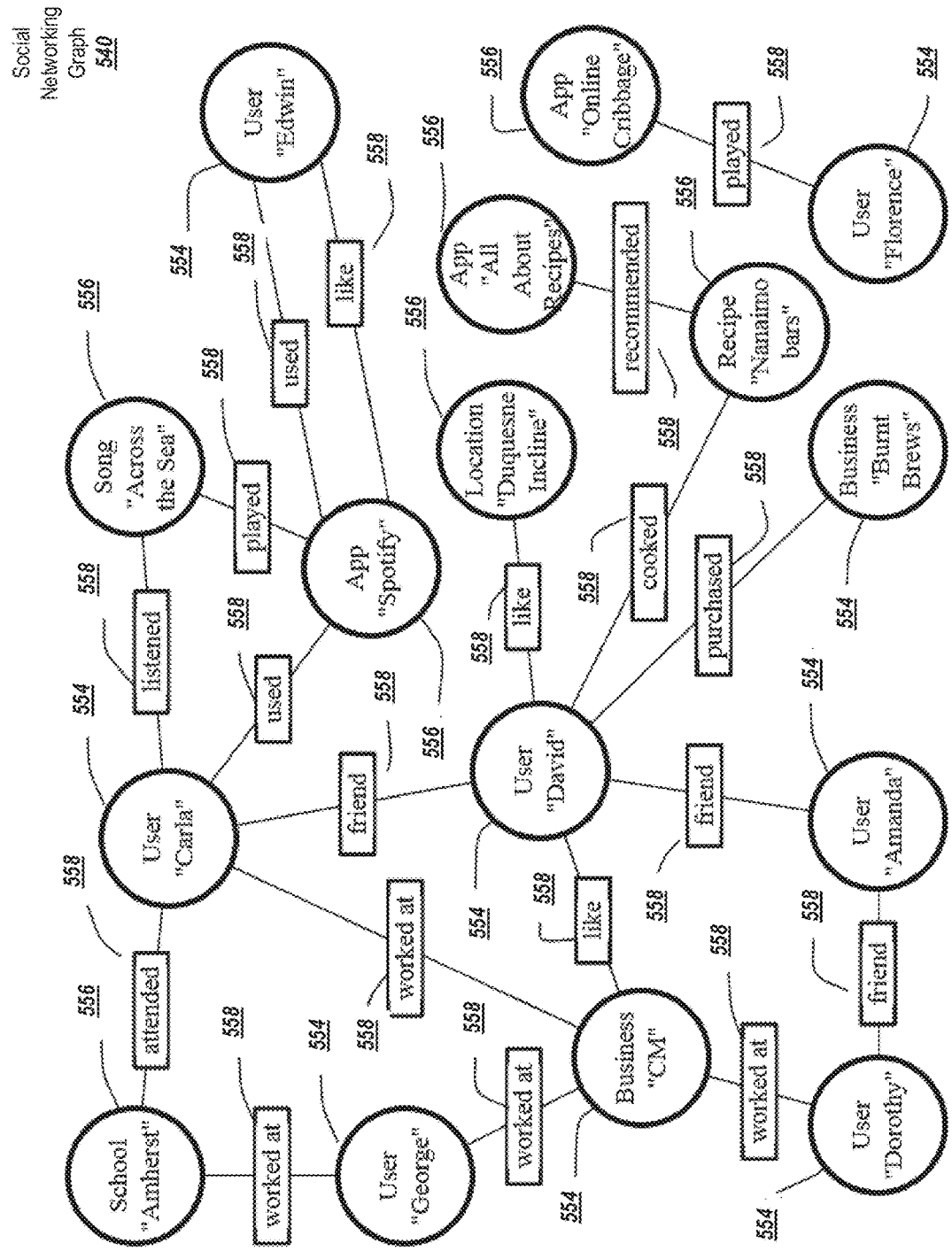
FIG. 5C depicts the social networking graph of FIGS. 8A-8B in more detail.

These examples may be implemented by a service provider system that is provided either locally, at a client device, or remotely (e.g., at a remote server). FIGS. 5A-5C depict various examples of service provider systems, and are discussed in more detail below.

FIG. 5A depicts an exemplary centralized service provider system 500, in which functionality for streaming music and remunerating music providers is integrated into a service provider server. The centralized system 500 may implement some or all of the structure and/or operations of a messaging service in a single computing entity, such as entirely within a single centralized service provider device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the service provider server 526), or may be located remotely at the service provider server 526 (in which case, the audio recording may be transmitted to the service provider server 526 and the service provider server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a service provider server 526. The service provider server 526 may be operative to coordinate communications between services provided by the service provider.

The service provider server 526 may include a network interface 522, communication preferences 528, and communication logic 530. The communication preferences 528 may include one or more privacy settings for one or more users and/or message threads. For example, the communication preferences 528 may include one or more settings, including default settings, for the logic described herein.

The communication logic 530 may include music streaming and/or remuneration logic logic 532 that is operable to stream music stored in a music library 534 and/or track remuneration metrics for music providers.

In some embodiments, messages may be sent peer-to-peer between users without the use of intervening server devices such as may implement the communication service 500. In these embodiments, the communication logic 530, including the streaming/remuneration logic 532, and the music library 534, may reside on the client devices 510.

The network interface 522 of the client 510 and/or the service provider server 526 may also be used to communicate through the network 524 with a social networking server 536. The social networking server 536 may include or may interact with a social networking graph 538 that defines connections in a social network. Furthermore, the service provider server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the music streaming/remuneration logic 532 and/or music library 534) are incorporated into the service provider 526. In contrast, FIG. 5B depicts an exemplary distributed communication system 550, in which functionality for streaming music and remunerating music providers is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate music server 552, which hosts the music streaming/remuneration logic 532 and the music library 534. The music server 552 may be distinct from the service provider server 526 but may communicate with the service provider server 526, either directly or through the network 524, to provide the functionality of the music streaming/remuneration logic 532 and the music library 534 to the service provider server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the service provider server 526 may have limited resources (e.g. processing or memory resources) that limit or preclude the addition of the additional pivot functionality. In such situations, the capabilities described herein may still be provided through the separate captioning server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
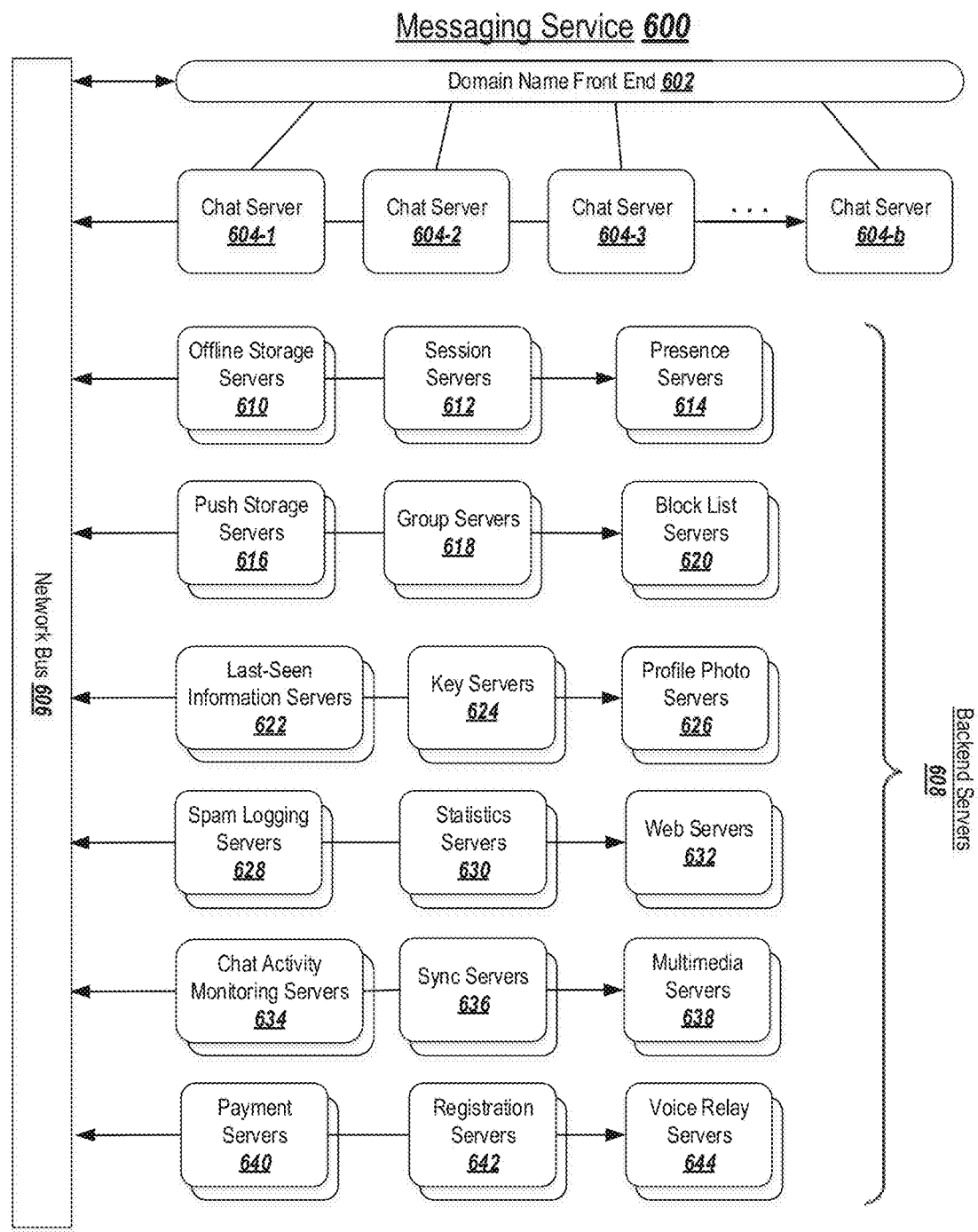
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the communication system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-Internet-protocol (VoIP) voice communication between messaging clients for the performance of VoIP calls.

Figure 7:
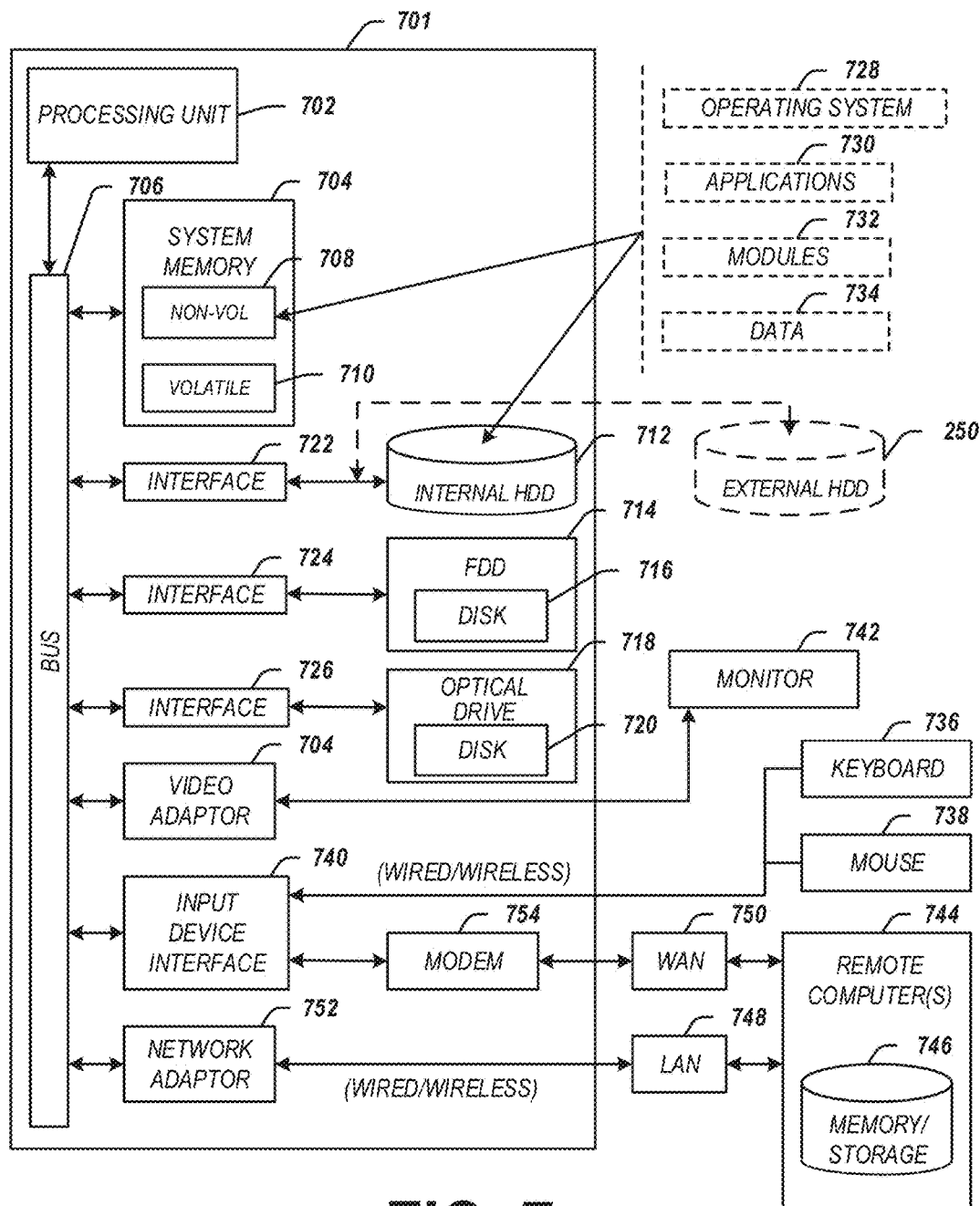
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
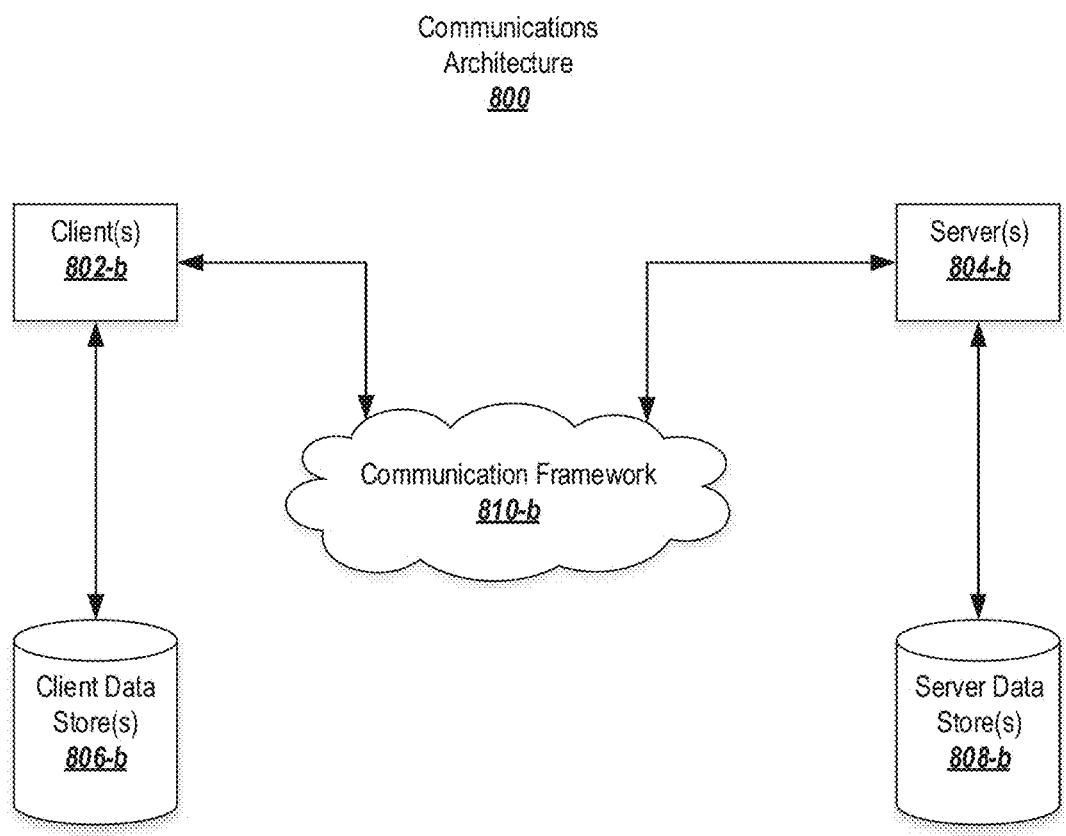
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
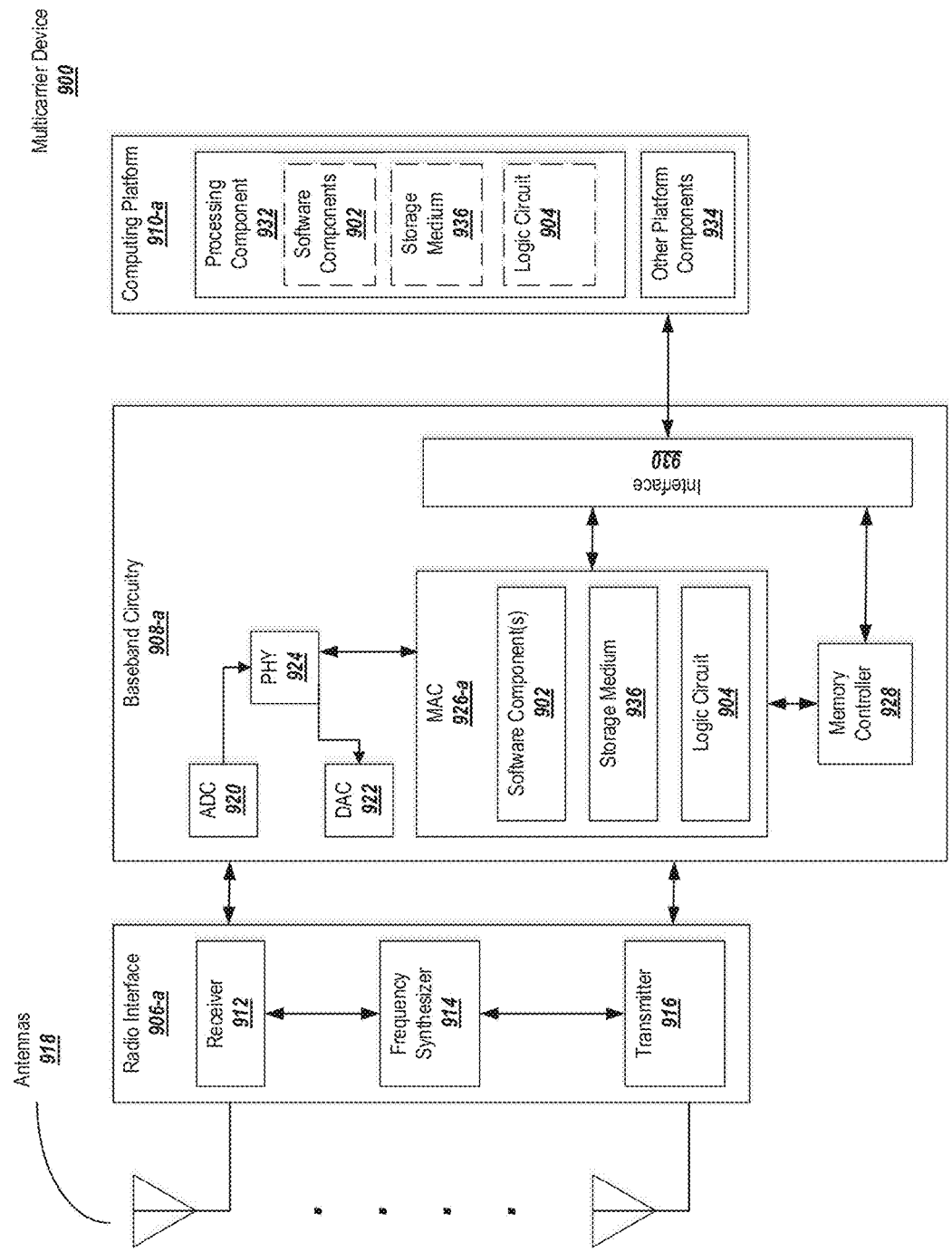
FIG. 9 is a block diagram depicting an exemplary multicarrier communications device.

FIG. 9 illustrates an embodiment of a device 900 for use in a multicarrier OFDM system, such as the communication system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the communication system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the communication system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   identifying a first webpage or first application active on a device and associated with a first service;
   streaming media through the first webpage or application;
   identifying a second webpage or second application active on the device and associated with a second service;
   determining that the second service is affiliated with the first service; and
   continuing streaming of the media in response to determining that the second service is affiliated with the first service.

2. The method of claim 1, further comprising:
   determining that a third webpage or third application associated with a third service becomes active on the device;
   determining that the third service is unaffiliated with the first service; and
   pausing playback of the music while the third webpage or third application is active.

3. The method of claim 1, further comprising displaying a visual advertisement in connection with at least one of the first service or the second service.

4. The method of claim 1, the streamed media associated with a provider, further comprising:
   tracking at least one metric associated with the streaming of the media through at least one of the first service or the second service; and
   transmitting the at least one metric to a remuneration service for remunerating the provider.

5. The method of claim 4, wherein the at least one metric includes an amount of engagement with at least one of the first service or the second service that is attributable to the provider.

6. The method of claim 1, wherein the streamed media is music, further comprising:
   creating a playlist including the music, the playlist assigned to a first user who is associated with the device;
   receiving an instruction to share the playlist with contacts of the first user in the service; and
   synchronizing a playback of the playlist between the first user and at least one of the contacts.

7. The method of claim 1, further comprising selecting the streamed media for playback based on an affinity between the streamed media and a user associated with the device in a social graph associated with at least one of the first service or the second service.

8. A non-transitory computer-readable medium storing instructions configured to cause one or more processors to:
   identify that a first webpage or first application is active on a device and associated with a first service;
   stream media in response to the first webpage or application being active;
   determining that a second webpage or second application becomes active on the device and is associated with a second service;
   determine that the second service is affiliated with the first service; and
   continue streaming of the media in response to determining that the second service is affiliated with the first service.

9. The medium of claim 8, further storing instructions configured to cause the processors to:
   determine that a third webpage or third application associated with a third service becomes active on the device;
   determine that the third service is unaffiliated with the first service; and
   pause streaming of the media while the third webpage or application is active.

10. The medium of claim 8, further storing instructions configured to cause the processors to display a visual advertisement in connection with at least one of the first service or the second service.

11. The medium of claim 8, the streamed media associated with a provider, further storing instructions configured to cause the processors to:
    track at least one metric associated with the streaming of the media through at least one of the first service or the second service; and
    transmit the at least one metric to a remuneration service for remunerating the provider.

12. The medium of claim 11, wherein the at least one metric includes an amount of engagement with at least one of the first service or the second service that is attributable to the provider.

13. The medium of claim 8 wherein the streamed media is music, further storing instructions configured to cause the processors to:
    create a playlist including the music, the playlist assigned to a first user who is associated with the device;

receive an instruction to share the playlist with contacts of the first user in the service; and synchronize a playback of the playlist between the first user and at least one of the contacts.

14. The medium of claim 8, further storing instructions configured to cause the processors to select the streamed media for playback based on an affinity between the streamed media and a user associated with the device in a social graph associated with at least one of the first service or the second service.

15. An apparatus comprising:
a non-transitory computer readable medium configured to store instructions for streaming media on the apparatus comprising;
identification logic configured to:
identify a first webpage or first application active on the apparatus and associated with a first service;
determine that a second webpage or second application associated with a second service becomes active on the apparatus; and
determine an association between the first service and the second service; and
playback logic configured to:
stream media on the apparatus, wherein the playback logic is configured to continue to stream the media after the second webpage or second application becomes active when the identification logic determines that the second service is affiliated with the first service.

16. The apparatus of claim 15, the playback logic further configured to pause streaming of the media when the identification logic identifies that a third webpage or third application associated with a third service unaffiliated with the first service becomes active on the apparatus.

17. The apparatus of claim 15, further storing display logic for displaying a visual advertisement in connection with at least one of the first service or the second service.

18. The apparatus of claim 15, the streamed media associated with a provider, and further comprising tracking logic configured to:
track at least one metric associated with the streamed media through at least one of the first service or the second service; and
a network interface configured to transmit the at least one metric to a remuneration service for remunerating the provider.

19. The apparatus of claim 18, wherein the at least one metric includes an amount of engagement with at least one of the first service or the second service that is attributable to the provider.

20. The apparatus of claim 15, wherein the streamed media is music, further comprising playlist logic configured to:
create a playlist including the music, the playlist assigned to a first user who is associated with the device;
receive an instruction to share the playlist with contacts of the first user in the service; and
synchronize a playback of the playlist between the first user and at least one of the contacts.

* * * * *